3,424,848
USE OF GERANYLHYDROQUINONE AS
RADIATION PROTECTIVE AGENT
Pierre Baranger, 6 Rue de Seine, Paris, France
No Drawing. Continuation of application Ser. No.
295,832, July 17, 1963. This application Dec. 9,
1966, Ser. No. 600,648
Claims priority, application France, July 20, 1962,
904,639
U.S. Cl. 424—346      5 Claims
Int. Cl. A61k 27/00

This invention relates to the use of geranylhydroquinone as a radiation protective agent. This is a continuation of application Ser. No. 295,832, filed July 17, 1963, now abandoned.

A study of geranylhydroquinone has shown it possesses therapeutical properties with respect to protection against radiation and the invention relates to its use for this purpose. Geranylhydroquinone possesses hitherto unknown properties of protection against radiation injury and it is an active medicament against disorders or reactions resulting from treatments with X-rays or gamma rays (cobalt bomb).

Geranylhydroquinone is a known compound.

Systematic study of geranylhydroquinone has shown it to be completely or almost completely free from toxicity. In particular, it effects no alteration of the blood formula. Moreover, it is tolerated perfectly and can be used over a long period. Clinical tests have been carried out on mice subjected to irradiation by X-rays.

Use was made of R.III mice, three months old, and the sensitivity of which to radiation had been determined.

In batches of six animals, the mice received a single, fatal dose of X-rays equal to 630 roentgens. Geraylhydroquinone was administered per os either immediately before or within five minutes after irradiation, in a single dose of 1 mg. The radioprotective action is estimated by examination of the mortality curves.

Geranylhydroquinone has been shown to possess radioprotective powers, which are manifested by a reduction of the percentage of deaths in a period of one month after irradiation.

If animals are subjected to irradiation with doses of 300–400 r., only slight mortality is produced, particularly if the animals have been carefully raised and protected against epidemics. On the other hand, this dose produces a massive reduction of the white corpuscle level in circulation—of the order of 80–90%—in the course of the 5–8 days following irradiation. Starting from the 10th day, the white corpuscle level rises again and becomes practically normal by about the 50th day.

Irradiation at 400 r.

In this experiment, which related to 18 mice, 9 of which were kept as control and 9 others were treated with geranylhydroquinone, blood counts were made every 5–7 days; the animals treated had a normal corpuscle level on the 35th day. At that date the control animals still had a deficit of about 70%.

Irradiation at 350 r.

This experiment also related to 18 animals: nine as control and nine mice treated. On the 35th day the corpuscle level was normal in the animals that had been treated, and only 60% in the control animals.

The clinical experiment related to patients receiving 5,000 to 12,000 roentgens. The products were administered per os at the rate of 20 to 80 cg. immediately before or after each X-ray or cobalt therapy session.

The following observations were made:

(1) Geranylhydroquinone, which is free from toxicity, is tolerated perfectly.

(2) The actinic reactions are considerably reduced and usually practically nil; they remain very slight in places where the skin is particularly fragile and in subjects very sensitive to rays.

Similarly, in cases where the rays are applied to mucous membranes, for example of the throat, the use of geranylhydroquinone according to the invention prevents epithelial reactions which affect the larynx and hinder swallowing.

Geranylhydroquinone consequently provides effective protection of the tissues subjected to radiation.

(3) Patients no longer suffer conditions of nausea or asthenia.

The blood counts, which are generally disturbed by the rays, remain stable, return to normal, or improve.

In the course of the treatment by X-rays of a certain number of patients, with the simultaneous application of geranylhydroquinone, a study of the blood count was made each week and revealed the following percentages:

(a) For doses of 20 cg. of geranylhydroquinone, on each irradiation, the following were recorded:

For the red corpuscles, stability or an increase greater than 200,000 in 80% of cases, a reduction not exceeding 300,000 in 20% of cases.

For the white corpuscles, a normal count or a rapid return to normal in 75% of cases, a high and stable count in 15% of cases, a reduction below normal in 10% of cases.

(b) For doses of 80 cg. for each irradiation, the following were recorded:

For the red corpuscles, stability or an increase higher than 200,000 in 100% of cases.

For the white corpuscles, a normal count or a rapid return to normal in 100% of cases.

The use of geranylhydroquinone according to the invention is therefore translated in the blood count into an increase of the red blood corpuscles and a stabilisation of the white blood corpuscles, that is to say it does not entail either red anaemia or leucophenia. There is no influence on trombopoiesis, and patients do not run the risk of hemorrhage or frequent bleeding.

Experiments in clinical treatment of humans

The following detailed examples of therapeutical treatment of humans illustrate the action of geranylhydroquinone against disorders resulting from radiotherapy.

Example

This relates to the radioprotective action of geranylhydroquinone. The patient suffered from a tumor of the pharynx and of the right hemilarynx. Histology revealed pinocellular epithelioma.

The patient was subjected to X-ray treatment for a period of two months. The total dose of X-rays was 9,850 roentgens.

Simultaneously with the radiotherapy treatment, two suppositories of geranylhydroquinone per day were administered for the first half of the first month. In the second half of the month, one intramuscular injection per day was given. At the end of the first month, there was no epithelial reaction of the larynx despite the doses of 650 roentgens administered. The injections were then stopped for fifteen days. The epithelial reactions appeared. The injections of geranylhydroquinone were then resumed and the radioepithelitis was found to disappear. After the end of the treatment, no actinic reactions of the laryngeal mucous membrane or radioepithelitis were found.

Analysis of the blood count gave the following results: 1½ months after commencement of treatment: 3,500,000 red corpuscles; 9,900 white corpuscles.

1 month after the end of the treatment: 3,500,000 red corpuscles; 9,500 white corpuscles.

Geranylhydroquinone can be administered in daily doses of 20 centigrams to 1 gram minimum, while these doses can be increased without danger at the beginning of a treatment. The fact that it is tolerated perfectly makes it possible to prolong the treatment and thus to effect consolidation of the results obtained.

A simple and practical method of utilization consists in forming an oily solution which can be used intramuscularly or orally. It can also be formed into suppositories or into ovules.

What is claimed is:

1. A method for alleviating in mammals at least one of the nausea, asthenia, epithelial and actinic reactions and the adverse effects on the red and white corpuscles associated with exposure to X-ray or gamma ray radiation which comprises administering to the mammal an effective, essentially non-toxic amount of geranylhydroquinone.

2. A method according to claim 1 wherein geranylhydroquinone is administered orally.

3. A method for alleviating in humans at least one of the nausea, asthenia, epithelial and actinic reactions and the adverse effects on the red and white corpuscles associated with X-ray or gamma ray therapy which comprises administering to the patient an effective, essentially non-toxic amount of geranylhydroquinone.

4. A method according to claim 3 wherein daily oral doses of geranylhydroquinone are administered.

5. A method according to claim 3 wherein a daily dose of about 20 cg. to one g. is administered.

References Cited

UNITED STATES PATENTS

| | | | |
|---|---|---|---|
| 1,697,168 | 1/1929 | Dohme | 260—625 |
| 1,942,827 | 1/1934 | Mills et al. | 260—625 |
| 2,008,337 | 7/1935 | Robinson et al. | 260—625 |
| 2,388,887 | 11/1945 | Weissberger et al. | 260—625 |

OTHER REFERENCES

Chemical Abstracts 40: 616$^4$ (1946).
Chemical Abstracts 41: 1632a (1947).
Chemical Abstracts 51: 14617c (1957).
Chemical Abstracts 55: 25039c (1961).
Chemical Abstracts 52: 11288g (1958).
Chemical Abstracts 61: 8800h (1964).
Chemical Abstracts 61: P1594oe (1964).

ALBERT T. MEYERS, *Primary Examiner.*

JEROME D. GOLDBERG, *Assistant Examiner.*